(12) United States Patent
Busdiecker et al.

(10) Patent No.: US 8,676,455 B2
(45) Date of Patent: Mar. 18, 2014

(54) METHODS AND SYSTEMS FOR SELECTING OR MAINTAINING AN EFFICIENT GEAR OR GEAR RATIO

(75) Inventors: Matthew R. Busdiecker, Royal Oak, MI (US); Vivek A. Sujan, Columbus, IN (US)

(73) Assignees: Eaton Corporation, Cleveland, OH (US); Cummins Inc., Columbus, IN (US); PACCAR Inc., Bellevue, WA (US)

( * ) Notice: Subject to any disclaimer, the term of this patent is extended or adjusted under 35 U.S.C. 154(b) by 154 days.

(21) Appl. No.: 13/397,311

(22) Filed: Feb. 15, 2012

(65) Prior Publication Data

US 2012/0209482 A1 Aug. 16, 2012

Related U.S. Application Data

(60) Provisional application No. 61/442,953, filed on Feb. 15, 2011.

(51) Int. Cl.
*G06F 7/00* (2006.01)

(52) U.S. Cl.
USPC .............................. 701/54; 701/55

(58) Field of Classification Search
USPC ...................................... 701/54, 55
See application file for complete search history.

(56) References Cited

U.S. PATENT DOCUMENTS

| | | | | |
|---|---|---|---|---|
| 5,406,483 A * | 4/1995 | Kallis et al. | ..................... | 701/53 |
| 6,537,175 B1 * | 3/2003 | Blood | ............................. | 477/44 |
| 7,179,189 B2 * | 2/2007 | Dourra et al. | ................. | 475/123 |
| 8,038,571 B2 * | 10/2011 | Tabata et al. | ..................... | 477/3 |
| 2003/0085577 A1 * | 5/2003 | Takaoka et al. | ............. | 290/40 C |
| 2004/0040375 A1 * | 3/2004 | Kadota et al. | ................... | 73/116 |
| 2008/0248920 A1 * | 10/2008 | Eriksson et al. | ................ | 477/74 |
| 2010/0087994 A1 * | 4/2010 | Bai | ................................ | 701/54 |
| 2010/0168946 A1 * | 7/2010 | Snyder | ............................ | 701/22 |
| 2010/0248896 A1 * | 9/2010 | Dreier | ........................... | 477/118 |
| 2012/0310499 A1 * | 12/2012 | Kiefer et al. | .................... | 701/65 |

* cited by examiner

*Primary Examiner* — Calvin Cheung
(74) *Attorney, Agent, or Firm* — Honigman Miller Schwartz and Cohn LLP

(57) ABSTRACT

A method in a system having a transmission and a drive system component is disclosed. The transmission includes two or more gears defining one or more gear ratios and a gear-selection controller having shifting schedules and the drive system component includes a drive system component controller. The method comprises dynamically generating adjustment information having information selected from the group consisting of (i) a desired gear selection; (ii) a desired drive system component speed operating point (iii) engine fuel economy improvement information related to a selection of a desired gear of the two or more gears; (iv) a drive system component energy efficiency map, and (v) a combination thereof, and wherein the generated information relates to one or more given drive system component power levels and adjusting the shifting schedules using the adjustment information.

25 Claims, 4 Drawing Sheets

US 8,676,455 B2

METHODS AND SYSTEMS FOR SELECTING OR MAINTAINING AN EFFICIENT GEAR OR GEAR RATIO

RELATED APPLICATIONS

This Application claims the benefit of U.S. Provisional Application 61/442,953 filed on Feb. 15, 2011, which is entirely incorporated herein by reference.

TECHNICAL FIELD

This disclosure relates to methods and systems for selecting or maintaining an efficient gear or gear ratio.

BACKGROUND

Conventional vehicular gear selection systems experience a lack of information exchange between the engine and the transmission. Only basic engine information may be communicated such as current engine speed, torque, and maximum torque curve. Typically, shift algorithms have fixed calibrations that are determined in an offline process. In these schemes, the engine torque curve and efficiency map may be known by the calibrator, and used with other vehicle parameters to develop the shift point calibration. These static shift calibrations do not typically attempt to make use of efficiency map information when selecting an appropriate gear or gear ratio during system operation.

SUMMARY

A method in a system having a transmission and a drive system component is disclosed. The transmission includes two or more gears defining one or more gear ratios and a gear-selection controller having shifting schedules and the drive system component includes a drive system component controller. The method comprises dynamically generating adjustment information having information selected from the group consisting of (i) a desired gear selection; (ii) a desired drive system component speed operating point (iii) engine fuel economy improvement information related to a selection of a desired gear of the two or more gears; (iv) a drive system component energy efficiency map, and (v) a combination thereof, and wherein the generated information relates to one or more given drive system component power levels and adjusting the shifting schedules using the adjustment information.

DESCRIPTION OF DRAWINGS

Like reference symbols in the various drawings indicate like elements.

DETAILED DESCRIPTION

The following description of the various embodiments is merely exemplary in nature and is in no way indented to limit the invention, its application or uses. For brevity, the disclosure hereof will illustrate and describe methods and systems for selecting or maintaining and efficient gear or gear ratio in various exemplary embodiments. Based on the foregoing, it is to be generally understood that the nomenclature used herein is simply for convenience and the terms used to describe the invention should be given the broadest meaning by one of ordinary skill in the art.

Figure 1:
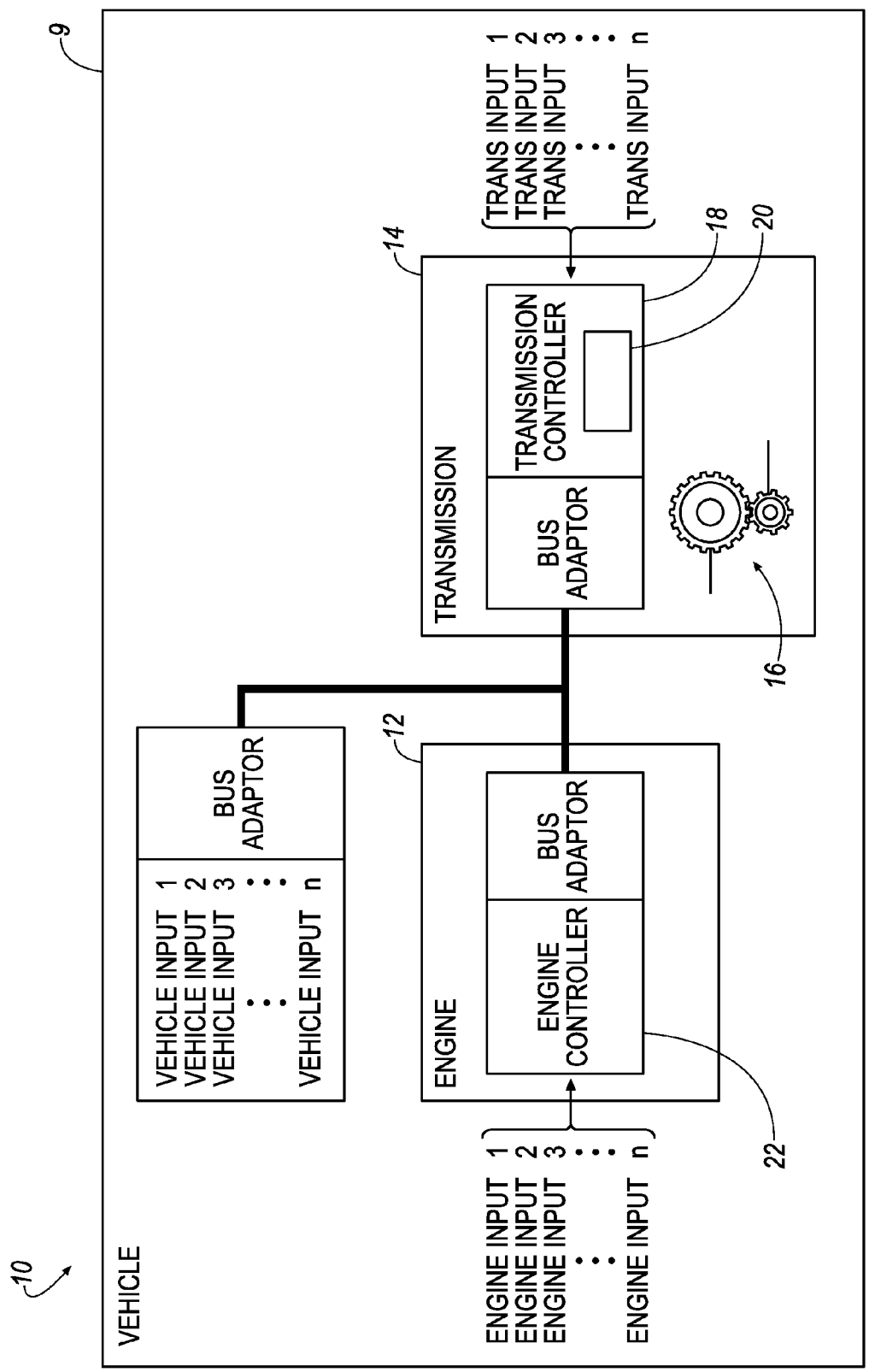
FIG. 1 depicts a schematic of an exemplary system incorporating an engine and a transmission.

Referring to FIG. 1, a system 10 is shown in schematic format. As depicted, a vehicle 9 is provided and comprises a system 10 including a drive system component 12, such as an engine 12 and a transmission 14. In an embodiment, transmission 14 includes a gear set 16 defining one or more gear ratios and a transmission controller 18 having one or more dynamically adjustable shifting schedules 20 stored in digital memory associated with transmission controller 10. Likewise, the engine 12 may include a drive system controller or an engine controller 22. Transmission controller 18 and engine controller 22 may be fabricated from a digital computer, analog computer or other devices capable of conducting logic operations. It is to be noted that for purposes of this disclosure, the embodiments and implementations discussed herein will reference drive system component, drive system controller and related items as an engine and an engine controller, respectively. Accordingly, it is to be appreciated that other drive system components are foreseen such that the invention should not be so limited to the disclosed systems. For example, and without limitation, drive system component 12 may be a powertrain.

Figure 2:
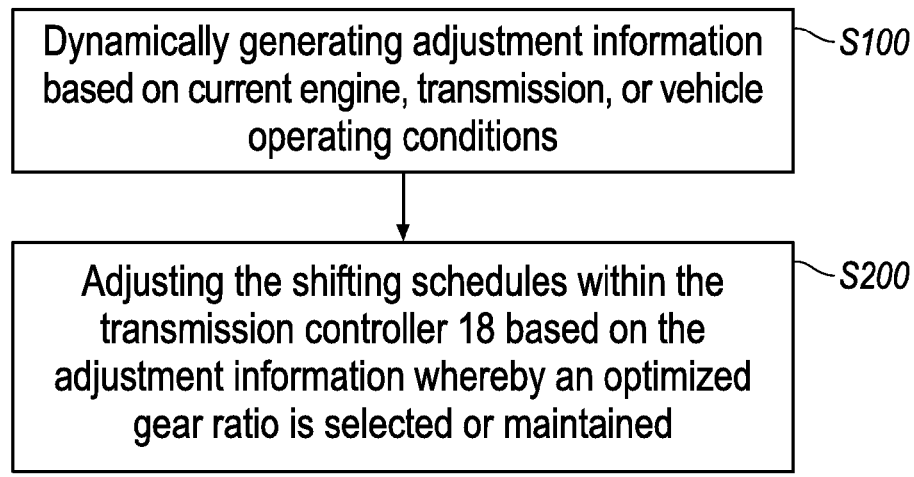
FIG. 2 is a process relating to the system depicted in FIG. 1.

With reference to FIG. 2, a method for selectively identifying an efficient gear or gear ratio is disclosed. The method involves the steps of dynamically generating adjustment information based on current engine, transmission or vehicle operating conditions at S100. Among other examples, the current engine operating conditions may include engine speed, vehicular speed, engine torque or the like. In an implementation, the adjustment information corresponds with one or more engine power settings. In an embodiment, a single engine power setting is utilized and, in still a further embodiment, single power is the real-time load placed on the engine. But, it is to be appreciated that the one or more engine powers may be an anticipated power or a range of powers, as will be discuss in more detail herein below.

In an implementation, the adjustment information may be related to a desired gear selection. In an implementation, the desired gear selection may be identified by engine controller 22 and may be based solely on the desired power output of engine 12 in view of the fuel efficiency related to obtaining that desired power output. It should be appreciated, however, that other engine parameters may be taken into account and the invention should not be so limited to the exemplary system described above. Similarly, the adjustment information may be related to a desired engine speed operating point. In an embodiment, the engine controller 18 may identify a desired engine speed and a generally optimum gear ratio for accommodating the desired engine speed using an efficient amount of fuel. Exemplarily, the desired engine speed operating point can be weighted based on the desirability of such operating points in relation to the current engine conditions.

In an implementation, the adjustment information may include data correlating an engine fuel economy improvement or declination should the gear ratio be adjusted. For example, and among others, if a vehicle is operating in a second gear, the adjustment information may include a correlation of engine fuel economy improvement or declination relating to the possibility of the vehicle gear being shifted into first gear and third gear.

In another implementation, the adjustment information may related to a gear efficiency map having efficiency information relating to the two or more gears, or the gear ratio, as it affects the power of the engine whereby the efficiency map identifies a relationship between the efficiency of the engine and one or more torques and one or more engine speeds. Further, in an embodiment, the adjustment information includes information relating to one or more engine speed ranges compared with one or more gear ratios and wherein the step of generating the adjustment information accounts for the gear ratio information.

In yet another implementation, the desired operating point is weighted based on the desirability of operating points based on the current engine conditions.

Referring back to FIG. 2, at step S200, the method may further comprise the step of adjusting the shifting schedules within the transmission controller 18 based on the adjustment information and other information that is germane to the transmission whereby an efficient gear ratio is selected or maintained.

In an implementation, the step of dynamically generating the adjustment information is processed by engine controller 22. However, it is to be appreciated that this step should not be so limited thereby (unless expressly provided in the claims) such that any controller may be utilized. For example, a third controller (not shown) may be used to generate the adjustment information. Such a controller may generate the adjustment information using external information such as routing information that may, for example, include road conditions (such as slope, contour, and the like). As discussed above, the given power related to the adjustment information may be anticipated by the routing information and the like. In such an embodiment, it is to be appreciated that the adjusting step further selectively adjusts the shift schedules based on the external information as well.

Similarly, in an implementation the step of adjusting the shifting schedules is processed by transmission controller 20. But it is also to be appreciated that this step should not be so limited thereby (unless expressly provided in the claims) such that any controller may be utilized.

Figure 3:
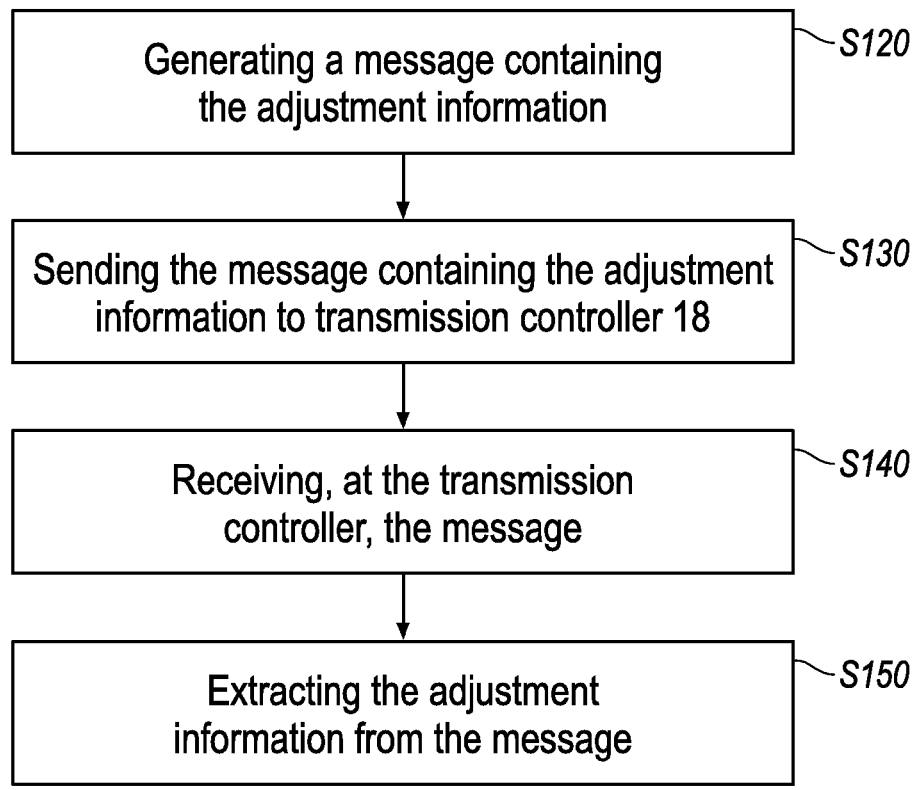
FIG. 3 is another process that may be incorporated within the system depicted in FIG. 1.

As will be appreciated, the bandwidth for communication between an engine controller and a transmission controller can be somewhat restrictive. Accordingly, and with reference now to FIG. 3, in an implementation, the method further comprises the steps of generating a message containing the adjustment information (S120), sending the message containing the adjustment information to transmission controller 18 (S130), receiving, at the transmission controller, the message (S140); and extracting the adjustment information from the message (S150).

Figure 4:
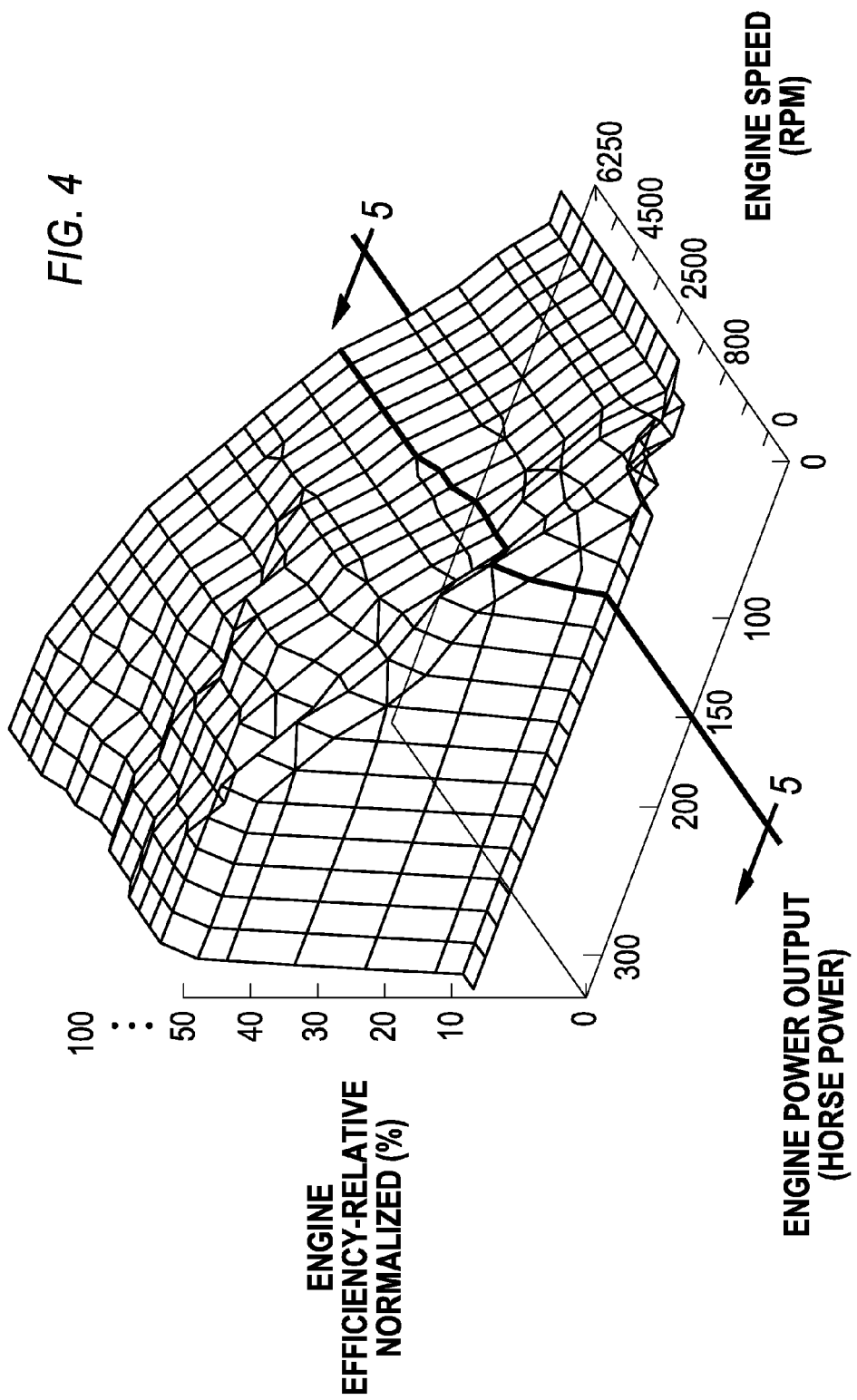
FIG. 4 illustrates an exemplary three-dimensional efficiency map.

FIG. 4 depicts an exemplary three-dimensional efficiency map that maps engine horse power output (x-axis) with a normalized energy efficiency (y-axis) and engine speed (z-axis). In an implementation, the adjustment information, and therefore, the message may include the entire energy efficiency map for a given power. But, as described above, the limited amount of bandwidth may generally restrict the continuous transmission of an entire energy efficiency map so it may be preferred to optimize that information being conveyed in the message.

Figure 5:
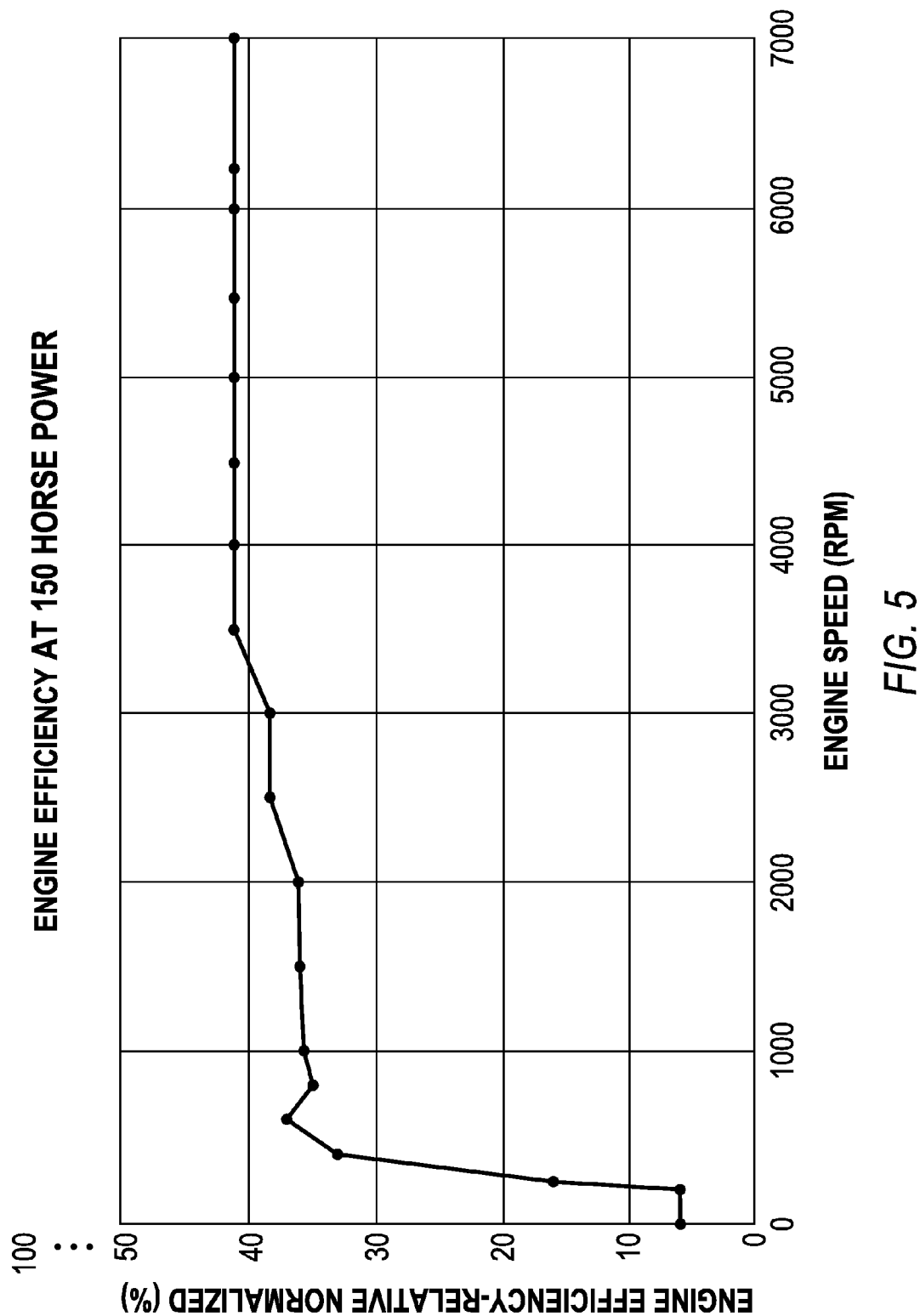
FIG. 5 is a cross section of the efficiency map illustrated in FIG. 4 and shows an exemplary chart engine depicting engine speed versus a normalized engine efficiency at a given engine horse power of 150.

As described above, the adjustment information may be based on a given power (e.g., real time load placed on the engine, an anticipated power requirement and the like). FIG. 5 depicts a subset of the energy efficiency map showing a portion (taken through Section 5-5 of FIG. 4) of the efficiency map at the 150 horse power setting. FIG. 5 includes engine speed (x-axis) versus the normalized engine efficiency (y-axis) at the given power setting of 150 horse power. In an implementation, the adjustment information, and therefore the message, may include the entire energy efficiency map of FIG. 4, or a subset thereof.

It still may be further desired to further optimize the adjustment information. Accordingly, in an implementation, mapping points are selected from the subset of the energy efficiency map. As an example, nineteen mapping points are selected from the subset of the energy efficiency map as shown in FIG. 5.

While a two-dimension subset of the energy efficiency map has been exemplarily discussed, it is to be appreciated that the subset of the energy efficiency map may be three-dimensional and may include information relating to two or more horse power settings.

In an implementation, the adjustment information, such as the mapping values discussed above, is packaged into a message packet and transmitted to transmission controller 20. Transmission controller 20 may thereafter use the efficiency map data as it is, or if finer resolution is needed it may interpolate between adjacent map points using any number of interpolation schemes. In an embodiment, the message is encoded and transmitted in a J1939 format over a serial digital communications bus. The serial digital communications bus may be the Controller Area Network (CAN) bus which is a standardized electronic communication mechanism commonly used on land based vehicles. The CAN bus has data rates on the order of 1 megabit/second and it uses a multi-master serial bus topology. The CAN network is often used to carryout communication between the engine, transmission and other "intelligent" powertrain components. Messages on the CAN network may be used to convey measured physical quantities, shaft speeds for example, as well as commands between nodes on the CAN network. The network has a limited bandwidth, and the prudent use of communication traffic on the CAN bus is important for the proper operation of the vehicle.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Also, although several applications of the systems and methods have been described, it should be recognized that numerous other applications are contemplated. Accordingly, other implementations are within the scope of the following claims.

What is claimed is:

1. A method comprising:
    providing a system having:
        a transmission including two or more gears defining one or more gear ratios,
        a gear-selection controller having shifting schedules, and
        a drive system component including a drive system component controller;
    dynamically generating adjustment information having information selected from the group consisting of:
        a desired gear selection,
        a desired drive system component speed operating point;
        engine fuel economy improvement information related to a selection of a desired gear of the two or more gears,
        a drive system component energy efficiency map, and
        a combination thereof,
    wherein the dynamically generated adjustment information relates to one or more given drive system component power levels; and
    adjusting the shifting schedules using the dynamically generated adjustment information.

2. The method according to claim 1 further comprising the step of:
    utilizing processing capabilities of the drive system component controller for executing the step of dynamically generating the adjustment information.

3. The method according to claim 2, wherein the adjustment information includes:
    a drive system component efficiency map that identifies a relationship between an efficiency of the drive system component and one or more engine torques and one or more engine speeds.

4. The method according to claim 3 further comprising the step of:

utilizing processing capabilities of the transmission controller for executing the step of adjusting the shifting schedules.

5. The method according to claim 1, wherein the drive system component includes:
   gear ratio information relating to the two or more gears, and wherein the step of dynamically generating the adjustment information accounts for the gear ratio information.

6. The method according to claim 1, wherein the desired drive system component speed operating point is weighted based on a desirability of operating points based on current drive system component conditions.

7. The method according to claim 1, wherein the drive system component controller initiates the adjusting step.

8. The method according to claim 1, wherein the drive system component is an engine, wherein the drive system component energy efficiency map is an engine efficiency map.

9. The method according to claim 1, wherein the drive system component is
   a powertrain, wherein the drive system component energy efficiency map is
   a powertrain efficiency map.

10. The method according to claim 1, wherein the drive system component controller is an engine controller.

11. A method in a system having a transmission and a drive system component, wherein the transmission includes two or more gears defining one or more gear ratios and a gear-selection controller having shifting schedules, and wherein the drive system component includes a drive system component controller, the method comprising:
    dynamically generating adjustment information having information selected from the group consisting of:
      a desired gear selection,
      a desired drive system component speed operating point,
      engine fuel economy improvement information related to a selection of a desired gear of the two or more gears,
      a drive system component energy efficiency map, and
      a combination thereof,
    wherein the dynamically generated information relates to one or more given drive system component power levels; and
    adjusting the shifting schedules using the adjustment information,
    wherein the adjustment information includes the drive system component energy efficiency map, and
    wherein the drive system component energy efficiency map includes information relating to the one or more given drive system component power levels versus drive system component speed and drive system component efficiency.

12. The method according to claim 11, wherein the one or more given drive system component power levels is a single power level.

13. The method according to claim 12, wherein the single power level includes real-time load requirements on the drive system component.

14. The method according to claim 12, wherein the drive system component energy efficiency map comprises:
    at least two mapping points thereby mapping engine speed with drive system component efficiency about the at least two mapping points.

15. The method according to claim 11, wherein the drive system component energy efficiency map comprises
    at least two mapping points thereby mapping drive system component power with drive system component speed with drive system component efficiency about the at least two mapping points.

16. The method according to claim 11, wherein the drive system component is
    an engine, wherein the drive system component energy efficiency map is
    an engine efficiency map.

17. The method according to claim 11, wherein the drive system component controller is
    an engine controller.

18. A method in a system having a transmission and a drive system component, wherein the transmission includes two or more gears defining one or more gear ratios and a gear-selection controller having shifting schedules, and wherein the drive system component includes a drive system component controller, the method comprising:
    dynamically generating adjustment information having information selected from the group consisting of:
      a desired gear selection,
      a desired drive system component speed operating point,
      engine fuel economy improvement information related to a selection of a desired gear of the two or more gears,
      a drive system component energy efficiency map, and
      a combination thereof,
    wherein the dynamically generated information relates to one or more given drive system component power levels;
    adjusting the shifting schedules using the adjustment information;
    generating a message containing the adjustment information;
    sending the message to the gear selection controller;
    receiving, at the gear selection controller, the message; and
    extracting the adjustment information from the message.

19. The method according to claim 18, wherein the message includes an entire energy efficiency map.

20. The method according to claim 18, wherein the message is encoded in a J1939 format.

21. The method according to claim 18, wherein the drive system component is
    an engine, wherein the drive system component energy efficiency map is
    an engine efficiency map.

22. The method according to claim 18, wherein the drive system component controller is
    an engine controller.

23. A method in a system having a transmission and a drive system component, wherein the transmission includes two or more gears defining one or more gear ratios and a gear-selection controller having shifting schedules, and wherein the drive system component includes a drive system component controller, the method comprising:
    dynamically generating adjustment information having information selected from the group consisting of:
      a desired gear selection,
      a desired drive system component speed operating point,
      engine fuel economy improvement information related to a selection of a desired gear of the two or more gears,
      a drive system component energy efficiency map, and
      a combination thereof,
    wherein the dynamically generated information relates to one or more given drive system component power levels; and adjusting the shifting schedules using the adjustment information, wherein the system further includes an intelligent module having automobile route information that includes road conditions, and wherein the adjusting step further selectively adjusts the shift schedules based on the route information.

24. The method according to claim 23, wherein the drive system component is an engine, wherein the drive system component energy efficiency map is an engine efficiency map.

25. The method according to claim 23, wherein the drive system component controller is an engine controller.

* * * * *